US008931270B2

(12) United States Patent
Kim et al.

(10) Patent No.: US 8,931,270 B2
(45) Date of Patent: Jan. 13, 2015

(54) HYDRAULIC BRAKE BOOSTER

(75) Inventors: Cheol Soo Kim, Yongin-si (KR); Kyu Man Lee, Asan-si (KR); Yoo Sang Kim, Pyeongtaek-si (KR)

(73) Assignee: Mando Corporation, Gyeonggi-Do (KR)

( * ) Notice: Subject to any disclaimer, the term of this patent is extended or adjusted under 35 U.S.C. 154(b) by 819 days.

(21) Appl. No.: 13/106,624

(22) Filed: May 12, 2011

(65) Prior Publication Data

US 2011/0277465 A1    Nov. 17, 2011

(30) Foreign Application Priority Data

May 12, 2010   (KR) ......................... 10-2010-0044252

(51) Int. Cl.
*B60T 13/12* (2006.01)
*B60T 13/14* (2006.01)

(52) U.S. Cl.
CPC ................................... *B60T 13/143* (2013.01)
USPC ........................................... 60/547.1; 60/553

(58) Field of Classification Search
USPC ................. 60/547.1, 552, 553, 554
See application file for complete search history.

(56) References Cited

U.S. PATENT DOCUMENTS

| 3,851,473 | A | * | 12/1974 | Bainbridge et al. | ............ 60/552 |
| 3,899,889 | A |   | 8/1975 | Swanson et al. | |
| 4,548,037 | A | * | 10/1985 | Farr | ................................. 60/552 |
| 5,813,230 | A |   | 9/1998 | Hartl et al. | |
| 6,775,979 | B1 | * | 8/2004 | Drott et al. | ....................... 60/588 |
| 6,840,586 | B2 | * | 1/2005 | Kusano et al. | ............. 303/114.1 |
| 2008/0257670 | A1 |   | 10/2008 | Drumm et al. | |
| 2009/0188385 | A1 |   | 7/2009 | Anderson et al. | |

FOREIGN PATENT DOCUMENTS

JP    2004-131057    4/2004

OTHER PUBLICATIONS

Chinese Office Action, w/ English translation thereof, issued in Chinese Patent Application No. CN 201110122305.6 dated Apr. 12, 2013.

* cited by examiner

*Primary Examiner* — Michael Leslie
(74) *Attorney, Agent, or Firm* — McDermott Will & Emery LLP

(57) ABSTRACT

Disclosed is a hydraulic brake booster. A relative movement structure of a control plunger and an output shaft is modified in such a manner that the output shaft operates in the control plunger, thereby reducing the overall length of the booster and the manufacturing cost. An inner circumferential surface of a guide of the control plunger does not make contact with an outer circumferential surface of the output shaft, so that the vibration and the impact caused by the contact between the control plunger and the output shaft are not delivered, thereby improving brake pedal feeling. The control plunger includes a guide having a groove, and an inner diameter of the guide is greater than an outer diameter of the output shaft. The control plunger and the output shaft perform relative movement in the overlap state therebetween, thereby reducing the overall length of the booster and the manufacturing cost.

7 Claims, 4 Drawing Sheets

HYDRAULIC BRAKE BOOSTER

This application claims the benefit of Korean Patent Application No. 10-2010-0044252 filed on May 12, 2010, in the Korean Intellectual Property Office, the disclosure of which is incorporated herein by reference.

BACKGROUND

1. Field

The disclosure relates to a hydraulic brake booster. More particularly, the disclosure relates to a hydraulic brake booster capable of improving brake pedal feeling while reducing the overall length thereof.

2. Description of the Related Art

In general, a brake booster outputs power remarkably greater than stepping force of a driver to a brake pedal.

The hydraulic brake booster according to the related art includes a master cylinder coupled with a housing, a working oil container coupled with the master cylinder to supply working oil, a simulator coupled with the housing to provide the repulsive force of the brake pedal, and a plurality of shafts to deliver the pedal pressure of the driver and the hydraulic pressure.

In addition, the hydraulic brake booster detects the displacement of the brake pedal through a pedal displacement sensor when the driver presses the brake pedal to close a shut-off valve to shut off the passage between the master cylinder of the pedal simulator and a wheel, and calculates a wheel pressure through an ECU (Electronic Control Unit) according to the pressure signal of a pressure sensor to independently feedback-control the pressure of each wheel.

In this case, when failure occurs in the hydraulic brake booster, the shut-off valve is in an NO (Normally Open) state. Accordingly, the hydraulic pressure of the master cylinder generated by the driver is introduced into the wheel cylinder, so that the minimum braking can be achieved when the failure occurs in the system.

SUMMARY

Since the above hydraulic brake booster includes a plurality of shafts to deliver the pedal pressure of the driver and a hydraulic pressure, the overall length of the hydraulic brake booster may be lengthened. The impact and the vibration caused by the contact between an output shaft and a control plunger are delivered to the brake pedal, so that brake pedal feeling may be degraded.

Accordingly, it is an aspect of the disclosure to reduce the overall length of a hydraulic brake booster by deforming the relative movement structure of a control plunger and an output shaft so that the output shaft can be operated in the control plunger, thereby reducing the manufacturing cost.

Accordingly, it is another aspect of the disclosure to a hydraulic brake booster capable of improving brake pedal feeling by increasing an inner diameter of a guide of the control plunger to more than an outer diameter of an output shaft so that the control plunger does not make contact with the output shaft when the control plunger and the output shaft perform relative movement.

Additional aspects and/or advantages of the disclosure will be set forth in part in the description which follows and, in part, will be apparent from the description, or may be learned by practice of the disclosure.

The foregoing and/or other aspects of the disclosure are achieved by a hydraulic brake booster including a housing having an oil port, a master cylinder coupled with the housing, and a working oil container coupled with the master cylinder to supply working oil. An input shaft is provided in the housing to move back and forth in connection with a brake pedal, a control plunger is provided in the housing to slidably move back and forth together with the input shaft, an output shaft is provided in the housing to move back and forth together with the control plunger, and a first piston moves back and forth together with the output shaft. The control plunger provided in the housing includes a guide so that the output shaft is inserted into the control plunger, and the guide has an inner diameter greater than an outer diameter of the output shaft so that the control plunger and the output shaft perform relative movement.

The control plunger and the output shaft move back and forth.

The guide has a first step surface formed by a step, the first step surface is provided therein with a receiving groove, and the control plunger includes a buffer member provided in the receiving groove to absorb impact occurring due to contact between the control plunger and the output shaft in sudden braking.

The receiving groove includes a first fixing groove to fix the buffer member, and the buffer member includes a fixing protrusion fixed into the fixing groove.

The housing is provided therein with a first receiving groove to receive the control plunger and the output shaft so that the control plunger and the output shaft perform relative movement, the first receiving groove has a second step surface formed by a step, and an elastic member is mounted on the second step surface to restrict a movement range of the control plunger and to absorb impact.

The hydraulic brake booster further includes a simulator coupled with the housing to provide repulsive force to the brake pedal. The housing includes a boost chamber communicating with the working oil container and a simulator chamber communicating with the simulator, the boost chamber and the simulator chamber are partitioned into each other, and the output shaft and the control plunger are spaced apart from each other.

As described above, according to the hydraulic brake booster of the disclosure, the pressure variation occurring in the master cylinder is not delivered to the brake pedal, so that the vibration of the brake pedal can be prevented. The disclosure can provide a hydraulic brake booster including a buffer member to absorb impact occurring when the control plunger makes contact with the output shaft in sudden braking and vibration generated from the master cylinder, thereby improving the brake pedal feeling.

BRIEF DESCRIPTION OF THE DRAWINGS

These and/or other aspects and advantages of the disclosure will become apparent and more readily appreciated from the following description of the embodiments, taken in conjunction with the accompanying drawings of which.

DETAILED DESCRIPTION OF THE EXEMPLARY EMBODIMENTS

Figure 1:
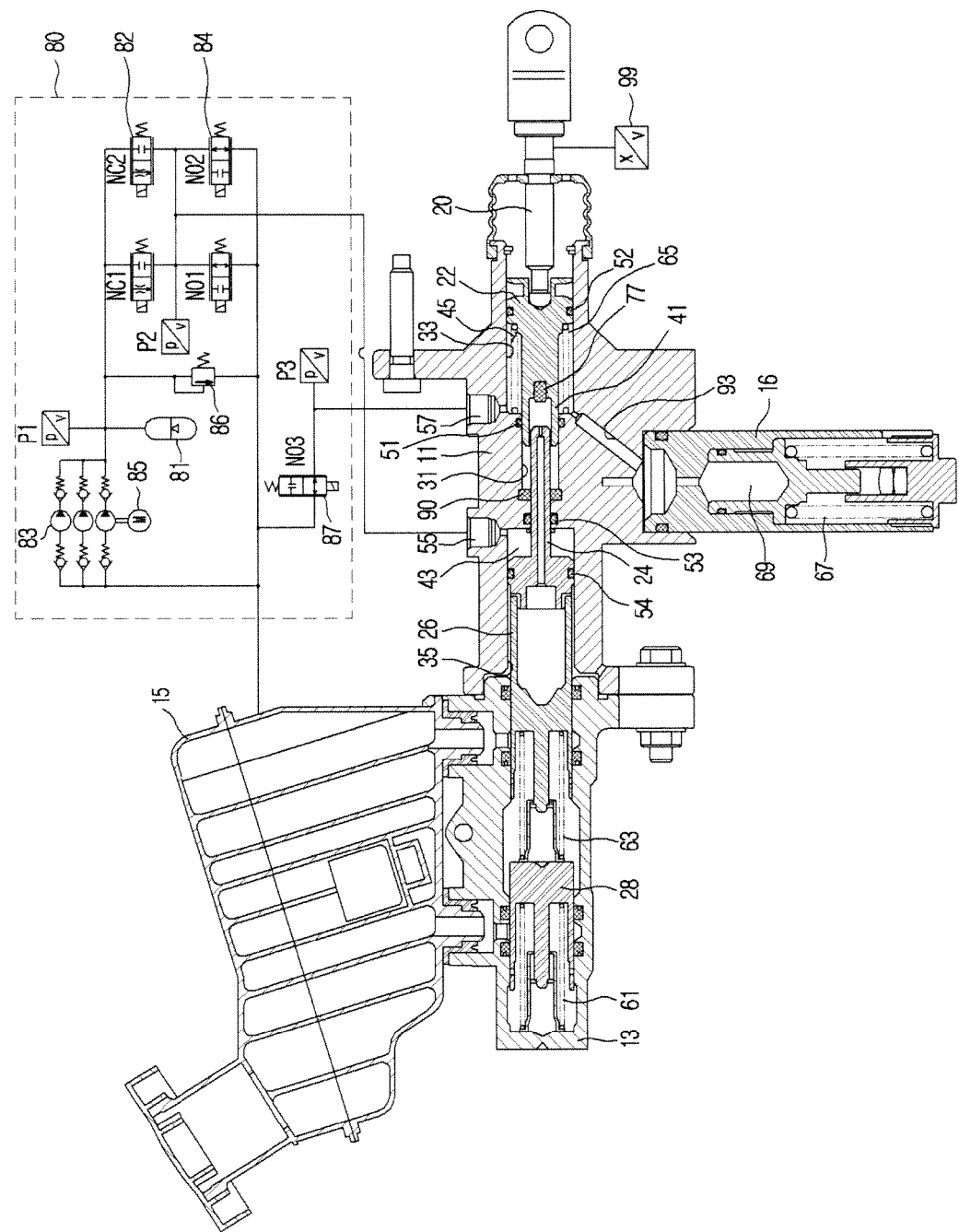
FIG. 1 is a sectional view showing a hydraulic brake booster when a driver presses a brake pedal in normal braking according to the disclosure.

Reference will now be made in detail to the embodiments of the disclosure, examples of which are illustrated in the accompanying drawings, wherein like reference numerals refer to the like elements. The embodiments are described below to explain the disclosure by referring to the figures.

Hereinafter, an exemplary embodiment of the disclosure will be described in detail with reference to accompanying drawings.

As shown in FIG. 1, a hydraulic brake booster according to the disclosure includes a housing 11 having first and second oil ports 55 and 57, a master cylinder 13 coupled with one end of the housing 11 to receive first and second pistons 26 and 28, a working oil container 15 coupled with an upper portion of the master cylinder 13 to store the working oil, a simulator 16 coupled with a lower portion of the housing 11 to provide the repulsive force of a pedal, a hydraulic pressure generator 80 linked with the working oil container 15 to generate a hydraulic pressure, and a pedal displacement sensor 99 to measure the displacement of an input shaft 20.

The housing 11 supports various parts provided therein. As shown in FIG. 1, the housing 11 receives the input shaft 20, a control plunger 22, an output shaft 24, and the first piston 26. The housing 11 is provided therein with the first and second oil ports 55 and 57 used to supply working oil from the hydraulic pressure generator 80.

The various shafts 20 and 24, the control plunger 22, and the first and second pistons 26 and 28 are received in the housing 11 to systematically perform predetermined movement so that the pedal pressure of the brake pedal and the hydraulic pressure can be delivered. In detail, as shown in FIG. 1, the disclosure includes the input shaft 20 provided in the housing 11 to move back and forth in connection with the brake pedal and including the pedal displacement sensor 99, the control plunger 22 provided in the housing 11 to slidably move back and forth together with the input shaft 20, the output shaft 24 provided in the housing 11 to move back and forth together with the control plunger 22, and the first and second pistons 26 and 28 provided in the master cylinder 13 to move back and forth together with the output shaft 24.

The pedal displacement sensor 99 is linked with the input shaft 20 to detect the displacement of the input shaft 20. The detection signal is transferred to an electronic control unit (not shown). The electronic control unit measures the displacement of the input shaft 20 and controls electronic valves 82, 84, and 87 provided in the hydraulic pressure generator 80.

The working oil container 15 supplies working oil to the master cylinder 13 and the hydraulic pressure generator 80. The working oil container 15 is provided therein with an outlet (not shown) used to exhaust the working oil so that the working oil may be supplied to the master cylinder 13.

The hydraulic pressure generator 80 compresses the working oil supplied from the working oil container 15 and supplies the working oil to a boost chamber 43 through the first oil port 55. As shown in FIG. 1, the hydraulic pressure generator 80 includes a hydraulic pump 83 to compress the working oil supplied from the working oil container 15 to high-pressure oil. The high-pressure working oil compressed in the hydraulic pump 83 is stored in an accumulator 81. In addition, the hydraulic pressure generator 80 includes a relief valve 86. If the pressure of a circuit reaches a preset pressure of a valve, the relief valve 86 drains a portion of fluid or the whole fluid to control a pressure such that the internal pressure of the circuit may be maintained to the preset value or less.

The boost chamber 43 is a space to receive the high-pressure working oil through the first oil port 55. As shown in FIG. 1, the boost chamber 43 is a space interposed between one end of a third receiving section 35 and one end of the output shaft 24. The high-pressure working oil is supplied to the space from the hydraulic pressure generator 80 through the first oil port 55. The high-pressure working oil introduced into the space in the above manner moves the output shaft 24 to generate braking force.

A third sealing member 53 is provided between an outer circumferential surface of the output shaft 24 and an inner surface of the housing 11 thereby preventing the working oil supplied to the boost chamber 43 from flowing out. The output shaft 24 is provided at one side thereof with a groove, and a fourth sealing member 54 is provided in the groove, so that the oil supplied to the boost chamber 43 may be compressed without leaking.

The working oil supplied to a simulator chamber 45 is supplied to the simulator 16. In other words, if the control plunger 22 compresses the simulator chamber 45, the working oil in the simulator chamber 45 is supplied to the simulator 16 through an oil passage 93.

Figure 2:
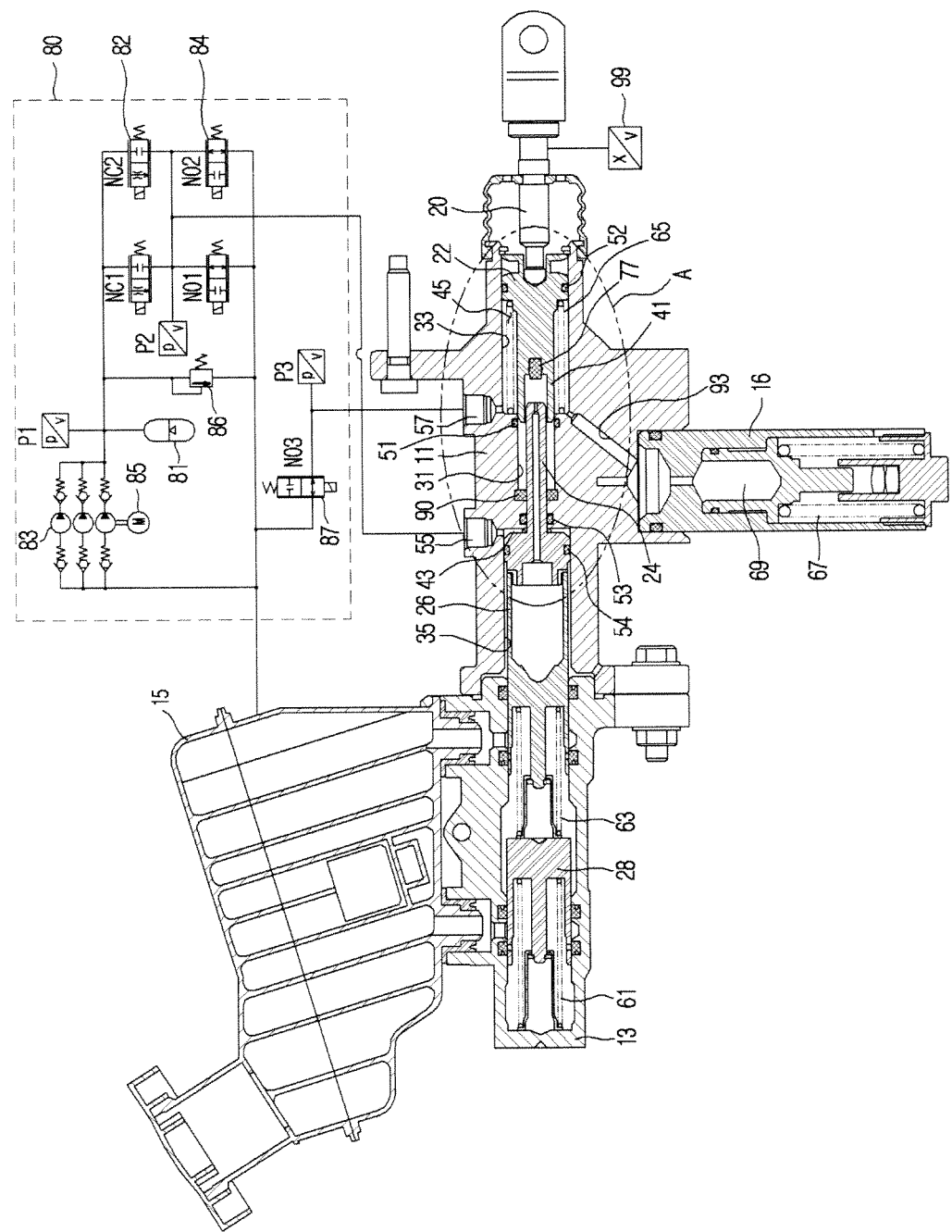
FIG. 2 is a sectional view showing the hydraulic brake booster when a driver depresses a brake pedal in normal braking according to the disclosure.

Meanwhile, as shown in FIGS. 1 and 2, the hydraulic pressure generator 80 includes the first to third electronic valves 82, 84, and 87 in order to control the flow of the working oil. The operation of the first to third electronic valves 82, 84, and 87 in normal braking is as follows. The first electronic valve 82 is closed in a normal state and is open if the first electronic valve 82 receives an open signal from the electronic control unit in braking. The second electronic valve 84 is open in a normal state and closed if the second electronic valve 84 receives a closed signal in braking. The third electronic valve 87 prevents the compressed working oil from flow back to the working oil container 15 from the simulator chamber 45 in braking. The third electronic valve 87 is open in ordinary times and closed if the third electronic valve 87 receives a closed signal from the electronic control unit in braking.

The simulator 16 provides the repulsive force of the brake pedal. The simulator 16 includes the oil passage 93 used to receive oil from the simulator chamber 45. The working oil supplied through the oil passage 93 allows a simulator piston 69 to move down. The simulator 16 is provided therein with a fourth spring 67. The fourth spring 67 lifts the simulator piston 69 by restoring force thereof.

A hydraulic pressure is produced in the master cylinder 13 by the working oil supplied from the working oil container 15 as the first and second pistons 26 and 28 move. The hydraulic pressure is transferred to the wheel brake of a vehicle for the purpose of braking. The first and second pistons 26 and 28 include springs 61 and 63 so that the first and second pistons 26 and 28 return the original positions thereof.

Figure 3:
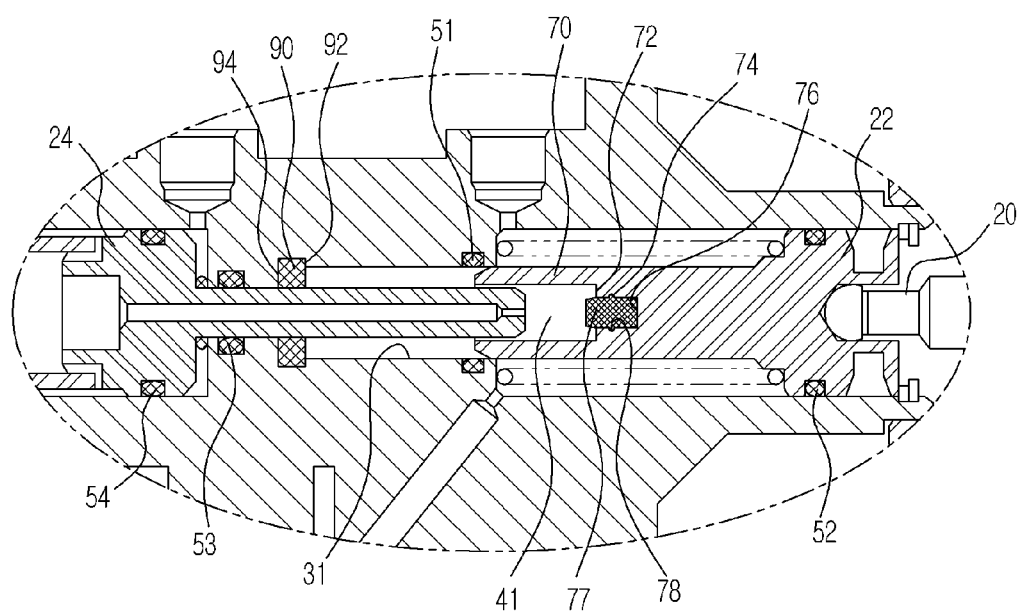
FIG. 3 is a sectional view showing a portion of FIG. 2 according to the disclosure.
Figure 4:
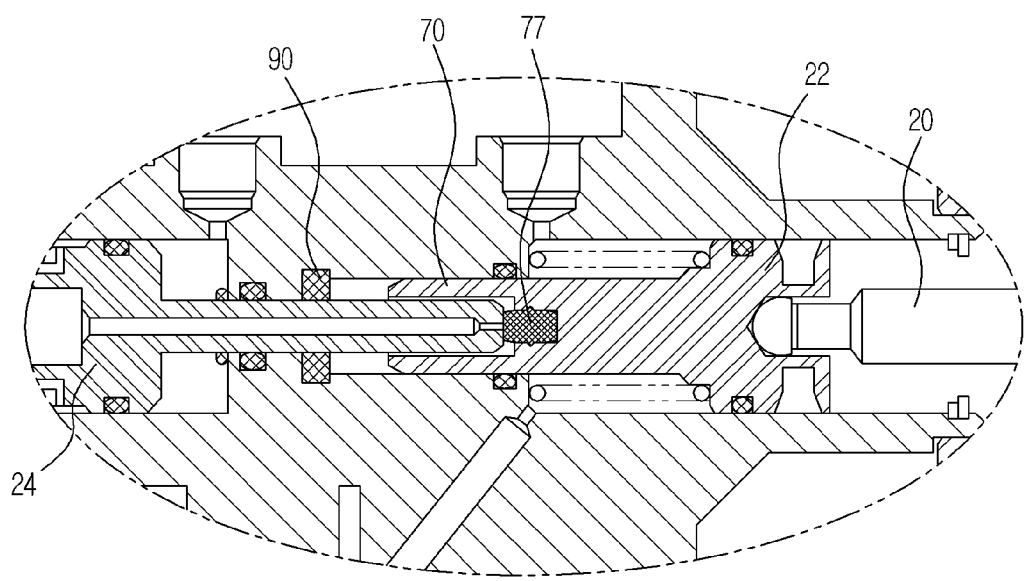
FIG. 4 is a sectional view showing a portion of the hydraulic brake booster in sudden braking according to the disclosure.

As shown in FIGS. 3 and 4, a separation chamber 41 is formed between one end of the control plunger 22 and one end of the output shaft 24 to absorb the vibration and the pressure generated from the output shaft 24. The vibration and the pressure generated from the output shaft 24 during the braking process are absorbed in the separation chamber 41 so that the vibration and the pressure from the output shaft 24 are not delivered to the brake pedal.

The control plunger 22 slidably moves back and forth in the housing 11 together with the input shaft 20. If the driver presses the brake pedal, the input shaft 20 moves forth and the control plunger 22 moves forth in connection with the input shaft 20. Since the control plunger 22 is linked with a third spring 65, the control plunger 22, which has moved forth, returns to the original position thereof by the restoring force of the third spring 65.

In detail, a first sealing member 51 is mounted on an outer circumferential surface of one side of the control plunger 22 and closely makes contact with the inner surface of the housing 11, thereby preventing the working oil from flowing into the control plunger 22. In addition, a groove is formed in an outer circumferential surface of an opposite side of the control plunger 22. A second sealing member 52 is installed in the groove, thereby preventing the working oil of the simulator chamber 45 from flowing out.

The control plunger 22 includes a guide 70 so that the output shaft 24 is inserted into the control plunger 22 to perform relative movement. As shown in FIG. 3, the guide 70 is provided therein with a groove so that the output shaft 24 may be inserted into the groove. The inner diameter of the guide 70 is greater than an outer diameter of the output shaft 24. In addition, the control plunger 22 and the output shaft 24 move back and forth. Therefore, the control plunger 22 and the output shaft 24 may perform relative movement. Since the control plunger 22 and the output shaft 24 overlap with each other, the overall length of the hydraulic brake booster is reduced, so that the manufacturing cost may be reduced. In addition, since an inner circumferential surface of the guide 70 does not make contact with an outer circumferential surface of the output shaft 24, the vibration and the impact are not delivered to the brake pedal. Accordingly, the brake pedal feeling can be improved.

The control plunger 22 includes a buffer member 77 fitted into a receiving groove 76 to absorb impact. The guide 70 includes a first step surface 72 formed by a step. The first step surface 72 is provided therein with the receiving groove 76 so that the buffer member 77 may be inserted into the receiving groove 76.

The receiving groove 76 is provided in an inner circumferential surface thereof with a first fixing groove 78 to fix the buffer member 77. The first fixing groove 78 is formed around the inner circumferential surface of the receiving groove 76. The first fixing groove 78 has a sectional surface in the shape of "C".

As shown in FIG. 3, the buffer member 77 is provided on an outer circumferential surface thereof with a fixing protrusion 74 corresponding to the first fixing groove 78 so that the buffer member 77 may be fixed by the fixing protrusion 74. The fixing protrusion 74 is integrated with the buffer member 77 and protrudes from the surface of the buffer member 77. The fixing protrusion 74 is formed in the shape of "C" around the outer circumferential surface of the buffer member 77. The buffer member 77 is pressed into the receiving groove 76 so that the fixing protrusion 74 closely makes contact with the first fixing groove 78. Accordingly, the buffer member 77 may be fixedly inserted into the receiving groove 76.

The buffer member 77 preferably includes a material having elasticity in order to reduce vibration and mitigate impact. In addition, the sectional surfaces of the fixing protrusion 74 of the buffer member 77 and the first fixing groove 78 are not limited to the shape of "C", but may have various shapes.

As shown in FIG. 3, the control plunger 22 includes an elastic member 90 installed in a second fixing groove 92 to restrict the movement range of the control plunger 22. As shown in FIG. 4, the control plunger 22 directly pushes the output shaft 24 during sudden braking or in the failure of a brake system. In this case, the movement range of the control plunger 22 is restricted by the elastic member 90.

In detail, the elastic member 90 closely makes contact with a second step surface 94 formed by a step in a first receiving section 31. The elastic member 90 closely makes contact with the second fixing groove 92 junctioned with the second step surface 94. Accordingly, the elastic member 90 not only restricts the movement range of the control plunger 22 but also absorbs impact.

Hereinafter, the operating procedure of the hydraulic brake booster according to the disclosure will be described.

When the hydraulic brake booster is normally subject to a braking operation, if a driver presses the brake pedal as shown in FIG. 1, the input shaft 20 linked with the brake pedal moves leftward in an axial direction. Simultaneously, the control plunger 22 moves leftward in the second receiving section 33.

In this case, the movement of the input shaft 20 is detected by the pedal displacement sensor 99, and the detection signal is transferred to an electronic control unit. The electronic control unit operates the hydraulic pump 83 to produce a braking hydraulic pressure. As the hydraulic pump 83 operates, the high-pressure working oil is stored in the accumulator 81. The high-pressure working oil is supplied to the boost chamber 43 through the first oil port 55 provided in the housing 11 to push the output shaft 24. The output shaft 24 pushes the first piston 26, and the first piston 26 pushes the second piston 28 to compress the working oil stagnated in the master cylinder 13 so that high-pressure working oil is produced. The high-pressure working oil is transferred to a wheel brake to generate braking force.

When the hydraulic brake booster is normally subject to the braking operation, if the driver depresses the brake pedal, the electronic control unit measures a signal detected by the pedal displacement sensor 99 as the input shaft 20 moves back. After measuring the signal, the electronic control unit transmits a signal to close the first electronic valve 82 to the first electronic valve 82. If the first electronic valve 82 is closed, the high-pressure working oil is not transferred to the wheel brake. Meanwhile, the control plunger 22, which has moved forward by stepping force of a driver to the brake pedal, moves back by elastic of the third spring 65 coupled with the second receiving section 33 and the control plunger 22. The control plunger 22 allows the input shaft 20 to move back so that the brake pedal returns to the original position thereof.

Next, when the hydraulic brake booster is subject to a sudden braking operation, as shown in FIG. 4, the control plunger 22 moves forward by more than a distance between the control plunger 22 and the output shaft 24 to directly push the output shaft 24. The output shaft 24, which has moved forward, pushes the first piston 26, and the first piston 26 pushes the second piston 28, so that the working oil in the master cylinder 13 is compressed to generate the braking hydraulic pressure. The braking hydraulic pressure is transferred to the wheel brake so that the braking force is generated.

When failure occurs in a hydraulic brake system, if the driver presses the brake pedal, the input shaft 20 allows the control plunger 22 to move forward. The control plunger 22 moves forward by more than the distance from the output shaft 24 to directly push the output shaft 24. The pushed output shaft 24 pushes the first piston 26, so that the first piston 26 is pushed together with the second piston 28. Accordingly, the working oil in the master cylinder 13 is compressed. The compressed working oil is transferred to the wheel brake, so that the braking force is generated.

Although few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A hydraulic brake booster comprising:
a housing having an oil port and first, second, and third receiving sections;
a master cylinder coupled with the housing; and
a working oil container coupled with the master cylinder to supply working oil,
wherein an input shaft is provided in the housing to move back and forth in connection with a brake pedal, a control plunger is provided in the housing to slidably move back and forth together with the input shaft, an output shaft is provided in the housing to move back and forth together with the control plunger, and a first piston moves back and forth together with the output shaft, and
wherein the control plunger provided in the housing includes a guide so that the output shaft is inserted into the control plunger, and the guide has an inner diameter greater than an outer diameter of the output shaft so that the control plunger and the output shaft perform relative movement, and
wherein a spring is disposed at an outer side of the control plunger and coupled with the second receiving section in the housing.

2. The hydraulic brake booster of claim 1, wherein the control plunger and the output shaft move back and forth.

3. The hydraulic brake booster of claim 1, wherein the guide has a first step surface formed by a step, the first step surface is provided therein with a receiving groove, and the control plunger includes a buffer member provided in the receiving groove to absorb impact occurring due to contact between the control plunger and the output shaft in sudden braking.

4. The hydraulic brake booster of claim 3, wherein the receiving groove includes a first fixing groove to fix the buffer member, and the buffer member includes a fixing protrusion fixed into the fixing groove.

5. The hydraulic brake booster of claim 1, wherein the first receiving section receives the control plunger and the output shaft so that the control plunger and the output shaft perform relative movement, the first receiving section has a second step surface formed by a step, and an elastic member is mounted on the second step surface to restrict a movement range of the control plunger and to absorb impact.

6. The hydraulic brake booster of claim 1, further comprising a simulator coupled with the housing to provide repulsive force to the brake pedal, wherein the housing includes a boost chamber communicating with the working oil container and a simulator chamber communicating with the simulator, the boost chamber and the simulator chamber are separated from each other, and the output shaft and the control plunger are spaced apart from each other.

7. A hydraulic brake booster comprising:
a housing having an oil port;
a master cylinder coupled with the housing; and
a working oil container coupled with the master cylinder to supply working oil,
wherein an input shaft is provided in the housing to move back and forth in connection with a brake pedal, a control plunger is provided in the housing to slidably move back and forth together with the input shaft, an output shaft is provided in the housing to move back and forth together with the control plunger, and a first piston moves back and forth together with the output shaft, and
wherein the control plunger provided in the housing includes a guide so that the output shaft is inserted into the control plunger, the guide has an inner diameter greater than an outer diameter of the output shaft so that the control plunger and the output shaft perform relative movement, and the guide has a first step surface formed by a step, the first step surface is provided therein with a receiving groove, and the control plunger includes a buffer member provided in the receiving groove to absorb impact occurring due to contact between the control plunger and the output shaft in sudden braking, and
wherein the receiving groove includes a first fixing groove to fix the buffer member, and the buffer member includes a fixing protrusion fixed into the fixing groove.

* * * * *